(12) United States Patent
Yonak et al.

(10) Patent No.: US 7,724,180 B2
(45) Date of Patent: May 25, 2010

(54) RADAR SYSTEM WITH AN ACTIVE LENS FOR ADJUSTABLE FIELD OF VIEW

(75) Inventors: Serdar H. Yonak, Ann Arbor, MI (US); Junzo Ooe, Miyoshi-Cho (JP)

(73) Assignees: Toyota Motor Corporation, Toyota (JP); Toyota Motor Engineering & Manufacturing North America, Inc., Erlanger, KY (US)

( * ) Notice: Subject to any disclaimer, the term of this patent is extended or adjusted under 35 U.S.C. 154(b) by 107 days.

(21) Appl. No.: 11/744,503

(22) Filed: May 4, 2007

(65) Prior Publication Data

US 2008/0272955 A1 Nov. 6, 2008

(51) Int. Cl.
*G01S 13/93* (2006.01)
*H01Q 3/46* (2006.01)

(52) U.S. Cl. ......................................... 342/70; 343/753
(58) Field of Classification Search ............. 342/70–72; 343/753
See application file for complete search history.

(56) References Cited

U.S. PATENT DOCUMENTS

| | | | | |
|---|---|---|---|---|
| 4,508,431 | A * | 4/1985 | Henshaw | 359/299 |
| 5,314,037 | A | 5/1994 | Shaw et al. | |
| 6,179,080 | B1 | 1/2001 | Kikuchi | |
| 6,433,751 | B1 * | 8/2002 | Ishitobi et al. | 343/753 |
| 6,456,230 | B2 | 9/2002 | Schwartz et al. | |
| 6,496,138 | B1 * | 12/2002 | Honma | 342/70 |
| 6,856,277 | B2 * | 2/2005 | Katayama et al. | 342/70 |
| 6,865,402 | B1 | 3/2005 | Gilbert | |
| 7,015,865 | B2 * | 3/2006 | Isaacs et al. | 343/757 |
| 7,068,234 | B2 * | 6/2006 | Sievenpiper | 343/745 |
| 7,092,144 | B2 * | 8/2006 | Blum et al. | 359/291 |
| 7,123,205 | B2 * | 10/2006 | Ratajczak et al. | 343/773 |
| 7,417,585 | B2 * | 8/2008 | Yamagami et al. | 342/158 |
| 2004/0189528 | A1 | 9/2004 | Killen et al. | |
| 2005/0057423 | A1 | 3/2005 | Delgado et al. | |

(Continued)

FOREIGN PATENT DOCUMENTS

FR 2705169 A1 * 11/1994

(Continued)

OTHER PUBLICATIONS

Electric-field-coupled metamaterials for microwave beam formation Justice, B.J.; Nguyen, V.N.; Yonak, S.H.; Kim, J.; Smith, D.R.; Antennas and Propagation International Symposium, 2007 IEEE Jun. 9-15, 2007 pp. 2566-2569.*

(Continued)

*Primary Examiner*—Thomas H Tarcza
*Assistant Examiner*—Cassi Galt
(74) *Attorney, Agent, or Firm*—Gifford, Krass, Sprinkle, Anderson & Citkowski, P.C.

(57) ABSTRACT

An example radar system for a vehicle comprises a radar antenna, operable to produce a radar beam, and a lens assembly including at least one active lens, the radar beam passing through the lens assembly. The radar beam has a field of view that is adjustable using the active lens. In some examples, the active lens comprises a metamaterial, the metamaterial having an adjustable property such as an adjustable negative index, the field of view being adjustable using the adjustable property of the metamaterial.

17 Claims, 7 Drawing Sheets

U.S. PATENT DOCUMENTS

| | | |
|---|---|---|
| 2005/0078048 A1 | 4/2005 | Delgado et al. |
| 2005/0107125 A1 | 5/2005 | Gilbert |
| 2005/0131614 A1 | 6/2005 | Isogai et al. |
| 2005/0168391 A1 | 8/2005 | Ratajczak et al. |
| 2005/0200540 A1 | 9/2005 | Isaacs et al. |
| 2005/0212705 A1 | 9/2005 | Legay et al. |
| 2005/0237265 A1 | 10/2005 | Durham et al. |
| 2006/0028385 A1* | 2/2006 | Davis et al. ............ 343/754 |
| 2007/0065068 A1* | 3/2007 | Wang ........................ 385/8 |
| 2007/0205938 A1* | 9/2007 | Zimmermann et al. ...... 342/69 |
| 2008/0258993 A1* | 10/2008 | Gummalla et al. .......... 343/876 |

FOREIGN PATENT DOCUMENTS

| | | | |
|---|---|---|---|
| FR | 2867617 | * | 9/2005 |
| JP | 2000075030 | | 3/2000 |
| KP | 102005003963 | | 4/2005 |

OTHER PUBLICATIONS

Metamaterials for automotive applications Sato, K.; Yonak, S.H.; Nomura, T.; Matsuzawa, S.-i.; Iizuka, H.; Antennas and Propagation International Symposium, 2007 IEEE Jun. 9-15, 2007 pp. 1144-1147.*

* cited by examiner

RADAR SYSTEM WITH AN ACTIVE LENS FOR ADJUSTABLE FIELD OF VIEW

FIELD OF THE INVENTION

The invention relates generally to vehicular radar systems.

BACKGROUND OF THE INVENTION

Current vehicular radar systems provide a single fixed width radar beam, for example as used in adaptive cruise controls. The beam widths of such systems are limited by the size of the antenna array aperture. The antenna aperture needs to be large compared to the radar wavelength to obtain a narrow radar beam, in the absence of other components. Hence, conventional high resolution radar systems try to maximize the antenna aperture, which poses a challenge for vehicular applications where cost, weight, and packaging are important.

SUMMARY OF THE INVENTION

A radar system for a vehicle comprises a radar antenna, operable to produce a radar beam; and a lens assembly including an active lens, the radar beam passing through the lens assembly. The field of view of the radar beam is adjustable using the active lens, through modification of the beam width and/or scan angle of the radar beam.

In some examples, the active lens comprises a metamaterial having an adjustable property, and the field of view is adjustable through control of the adjustable property of the metamaterial, for example using an electrical signal. The lens assembly may include a vehicle component, such as a grille component (such as the vehicle badge) or a bumper component. The vehicle component may comprise an active material. The lens assembly may further comprise a radome. A radome acts to protect components of the apparatus from the elements, and this function may be provided by a vehicle component. The metamaterial may include electrically conducting elements interconnected by switches, for example as a multi-layer printed circuit board assembly, the switches being selectively opened or closed using an electronic control signal.

An adjustable field of view may be achieved by varying the scan angle of a radar beam and/or the beam width. If the beam width is narrow compared with the scan angle, the field of view is approximately the same as the scan angle. Both the scan angle and beam width may be adjusted using an active lens. For example, using a metamaterial to provide a diverging lens of varying strength, the beam width and/or scan angle (as measured after the beam has passed through the lens assembly) can be adjusted. An electronic circuit can be used to provide an electronic control signal to the active lens, the field of view of the beam being adjustable using the electronic control signal. The operational mode and/or field of view may be adjusted according to one or more vehicle parameters, such as vehicle speed, location, driver selection, and the like.

Embodiments of the present invention include a radar system for a vehicle having a plurality of operational modes, each operational mode having a different field of view. Operational modes of the radar system may be used to provide various functions, in connection with other vehicle systems, such as providing an adaptive cruise control, pedestrian detection, vehicle detection, animal detection, or parking assistance for the vehicle.

The term "active", as used in the terms active lens and active material, refers to a lens or material having a property that can be adjusted, for example through an electronic control input, so as to modify the properties of a radar beam passing therethrough. For example, the refractive index (at radar frequencies) of an active material may be adjusted so as to modify the beam shape of a radar beam passing through the active material.

The term lens assembly refers to one or more lenses, possibly in combination with other components such as a radome, through which a radar beam passes. An active lens assembly is a lens assembly including at least one active lens, and the term includes the use of a single active lens.

DETAILED DESCRIPTION OF THE INVENTION

Figure 1A:
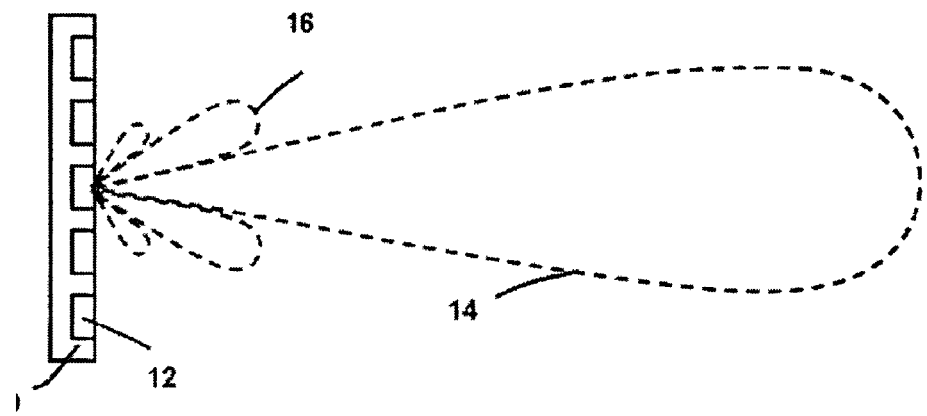
FIGS. 1A-1C show a radar beam provided by an antenna, an arrangement of an antenna array, and an antenna in combination with an active lens (respectively)

The invention relates to vehicular radar systems, including examples in which a radar beam has a beam shape, and hence beam width, that can be modified by adjustment of an active lens.

An example radar system comprises an antenna, at least one active lens, and optionally components of the vehicle grille. The antenna array may have a radome, so as to protect the antenna array elements from the environment. The radome may include an active lens, or an active lens may be enclosed within a separate protective radome.

A lens may comprise an active material, such as a material having an adjustable refractive index at radar frequencies. An active lens may allow a continuous range of field of view to be obtained, where the field of view may be the beam width of an unscanned beam, the scan angle of a narrow beam, or a combination of beam width and scan angle.

The field of view can be controlled using to a control input signal that modifies one or more properties of the active material. The lens may be switchable between different states, for example allowing a discrete number of beam shapes to be obtained according to a control input signal. These may, for example, correspond to narrow, medium, and wide fields of view. In other examples, a combination of switched elements and tuned elements may be used to obtain a desired beam width and/or scan angles less than or equal to 360°.

A radar system having an active lens allows the radar system to have multiple operational modes. These operational modes may include detection and ranging for adaptive cruise control, crash avoidance, and higher resolution operation (e.g. a narrower beam) for imaging and target identification. Wide fields of view may be used for near field parking assistance and pedestrian detection.

In some embodiments, the active lens comprises an active metamaterial. An example metamaterial includes a periodic electromagnetic structure, for example a periodic composite comprising two or more materials (in some examples, one component may be air). Both positive and negative refractive indices at the appropriate radar frequency may be obtained using metamaterials. The refractive index of an active metamaterial may be adjusted, for example using MEMS (Micro-Electro-Mechanical Systems) switches or other MEMS capacitive devices to selectively interconnect conductive elements, applying electric fields across electrically tunable materials, or other approaches.

An active lens may be effectively deactivated, so as to have a substantially reduced effect on radar beam shape. A small aperture antenna array provides an (unmodified) wide field of view (e.g. wide beam and/or wide scan angle) for use as a parking aid or near field adaptive cruise control, or pre-crash sensor. Activation of the active lens reduces the beam width, giving a narrow beam which may be used, for example, for longer-range object detection, imaging, object identification, or other applications.

Object identification may include identification of other vehicles, pedestrians, animals, and the like at distances beyond the visual limits of a driver. In particular, the use of radar may allow improved imaging and/or object identification during poor visibility conditions such as rain, snow, fog, or darkness.

In other examples a compound lens system may be used. The use of a lens assembly including one or more lenses allows miniaturization of antenna arrays for vehicular applications. Both narrow and wide fields of view may be obtained while using smaller radar apertures than presently used. Antenna miniaturization allows the antenna to be less obtrusively mounted on a vehicle. For example, the antenna may be located behind or within a vehicle component, such as a grille element (such as a vehicle badge), a bumper, light fixture, body panel, and the like. In some examples of the present invention, the vehicle component comprises an active metamaterial.

FIG. 1A illustrates a conventional antenna array 10, including radiative elements 12, generating a radar beam having main lobe 14 and side lobes such as 16. Without a lens, the beam width, the width of the main lobe 14 is determined by the antenna array size. Further, the main lobe to side lobe ratio is determined by the number of array elements. The width of the main lobe may be referred to as the beam width.

Figure 1B:
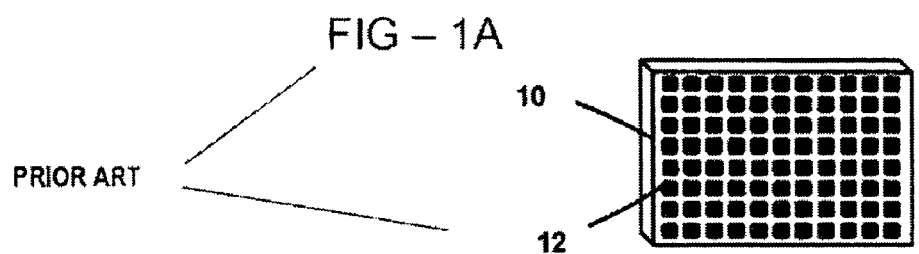

FIG. 1B is a view of a two-dimensional arrangement of antenna radiative elements 12. The antenna array size is related to the physical dimensions of the arrangement. Other arrangements may be used, for example antenna elements disposed on a curved surface.

The radar antenna is operable to provide a radar beam, such as a beam of millimeter-wave radiation. The radar antenna, and associated circuitry, may be operational to transmit and receive reflected or otherwise returned radar, for example using a conventional transmission and/or receiving circuits.

In general, reducing the physical size of the antenna array produces a wider main lobe, and hence a wider radar beam. The use of a lens allows the antenna array to be miniaturized, while allowing a relatively narrow beam to be obtained. Beam widths obtained from a combination of an antenna and a lens may be as narrow as those obtained from a larger antenna with no lens. A wider beam generally corresponds to a shorter range of operation, other beam parameters and/or circuitry being similar.

Figure 1C:
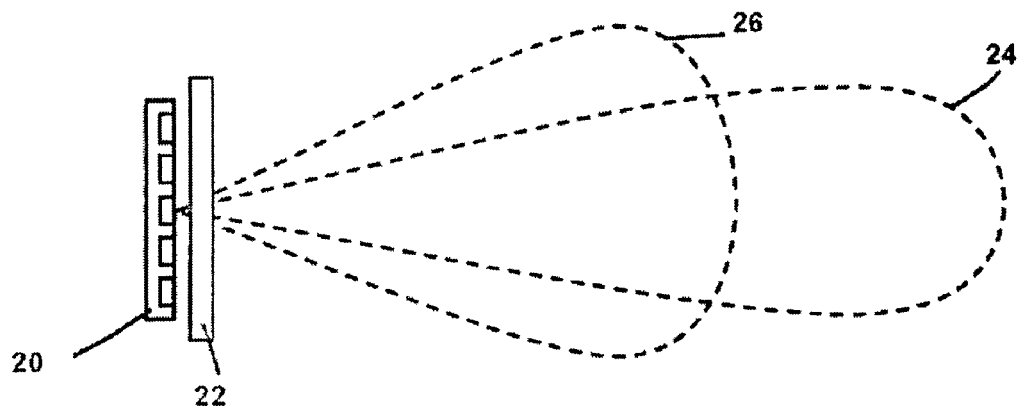

FIG. 1C shows a combination of antenna array 20 and lens 22. In this case, the antenna array 20 is smaller than the antenna array 10 shown in FIG. 1A. In the absence of any further beam conditioning, the beam width is wider, as shown at 26. However, the use of a lens allows a beam width similar to that of the larger array to be obtained, as shown at 24. Hence, the effective aperture of a smaller antenna can be enlarged using the lens, allowing a beam width to be obtained that is similar to that of a larger antenna array, and so use of a lens allows miniaturization of the antenna. Further, a plurality of beam widths may be obtained (for example, as shown by the two main lobes 24 and 26) through the activation or deactivation of the lens, or other lens adjustment.

The terms beam shape and beam width apply to the main lobe of the radiative field, and side lobes are not considered unless otherwise stated. For example, FIG. 1C only shows the main lobes.

Figure 2A:
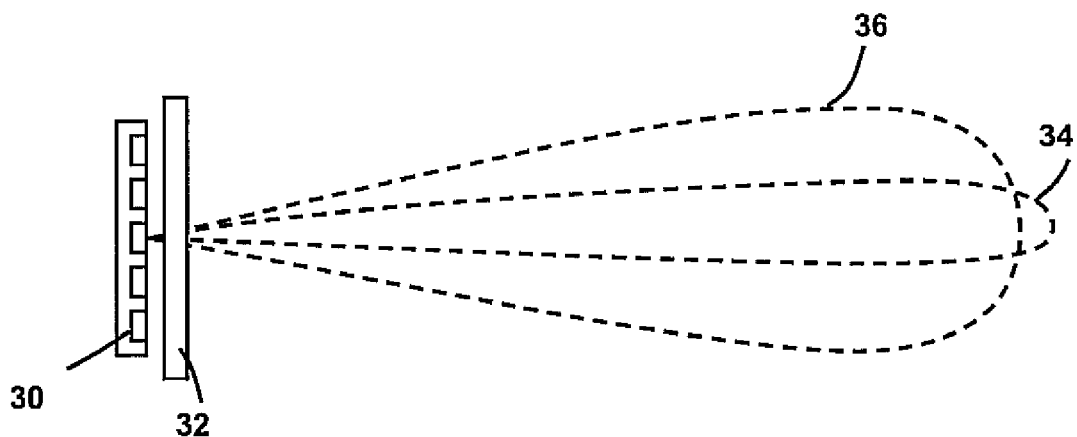
FIGS. 2A and 2B show adjustment of beam shape using active lens assemblies, including one and two lenses respectively.

FIG. 2A shows an antenna array 30 and active lens 32. The beam width may be controlled using the active lens. The beam obtained using the active lens 32 can be narrowed from that shown at 34 to that shown at 36. The active lens may be electronically adjusted using an electronic control input, for example as is described in more detail elsewhere.

Figure 2B:
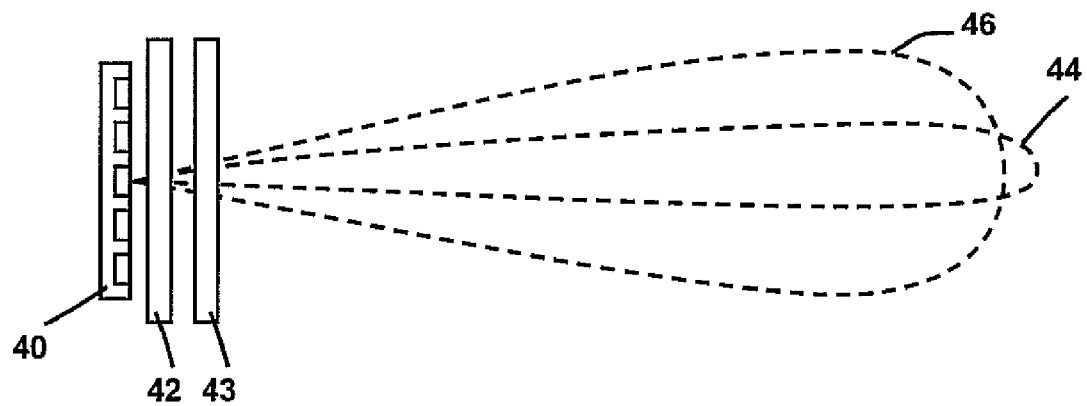

FIG. 2B shows a system including an antenna array 40 and a lens assembly including two lenses 42 and 43. In this example, one or both lenses are active lenses, allowing a narrow (44) or wide (46) radar beam to be obtained. The terms narrow and wide are relative terms, to each other. In some examples, one or both lenses may be deactivated. Other multiple lens assemblies can be used to obtain a wider tuning of beam width, or further antenna miniaturization. For example, two or more lenses may be activated, partially activated, and/or deactivated together, or one or more of a plurality of active lenses activated, partially activated, and/or deactivated.

Figure 3:
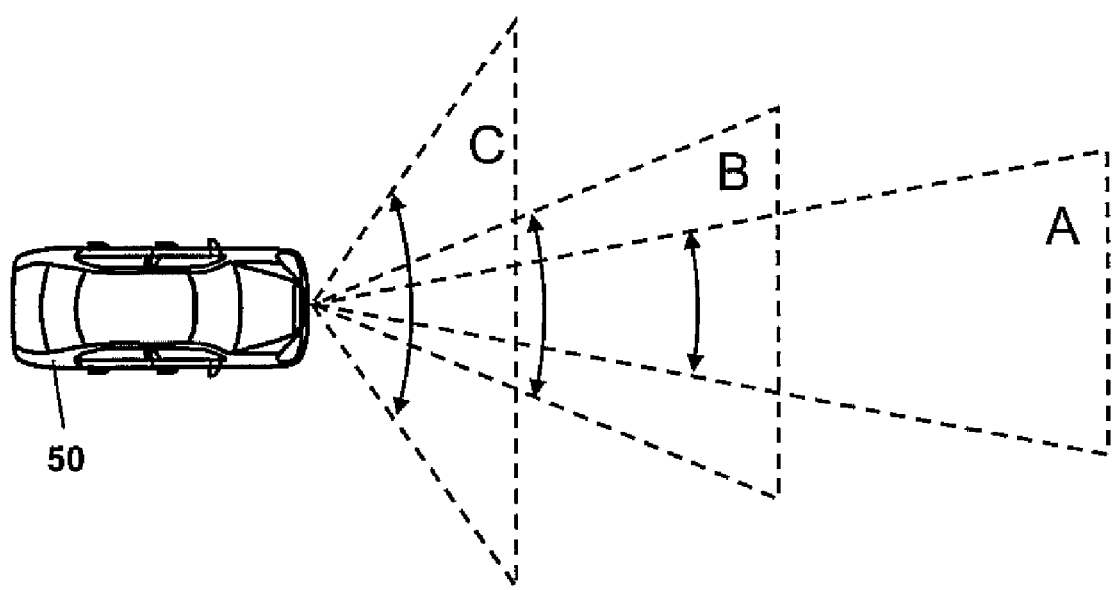
FIG. 3 shows a switchable and/or tunable radar system for a vehicle, in which the radar system has narrow, intermediate, and wide beam width operational modes.

FIG. 3 shows a vehicle 50 having a radar system according to an embodiment of the present invention supported thereon. The three triangles labeled A, B and C approximate the fields of view three possible operational modes of the radar system, having different resolutions. In this example, the first mode labeled A corresponds to a long range, high angular resolution beam with a narrow scan angle. The second mode labeled B corresponds to a medium range, medium angular resolution beam with an intermediate scan angle. The third mode labeled C corresponds to a short range, lower angular resolution beam with a wide scan angle.

The radar system may be switched between such configurations, or may be tuned continuously between or through such configurations. The long range configuration (A) may be used for automatic cruise control (ACC) or pre-crash sensing (PCS) applications. The medium range configuration may be used for cut-in detection, intersection violations such as failure to stop at a stop light, to enhance the PCS, or used to detect animals or pedestrians entering the roadway. The short range configuration, having a very wide field of view, may be used for pedestrian detection in urban areas, parking assistance, or similar applications.

Hence, an improved radar system for a vehicle according to some embodiments of the present invention has a plurality of operational modes, including a first operational mode providing a high resolution beam and a narrow scan angle and a second operational mode providing a intermediate resolution beam and a medium scan angle. The terms narrow and wide and low and intermediate are used relatively. The first operational mode may be an imaging mode, automatic cruise control, or pre-crash sensing mode. The second operational mode may be used for pedestrian sensing, intersection violation, parking assistance, or other short-range operation. A single apparatus may be used to provide multi-function operation, including these or other functions.

Figure 4:
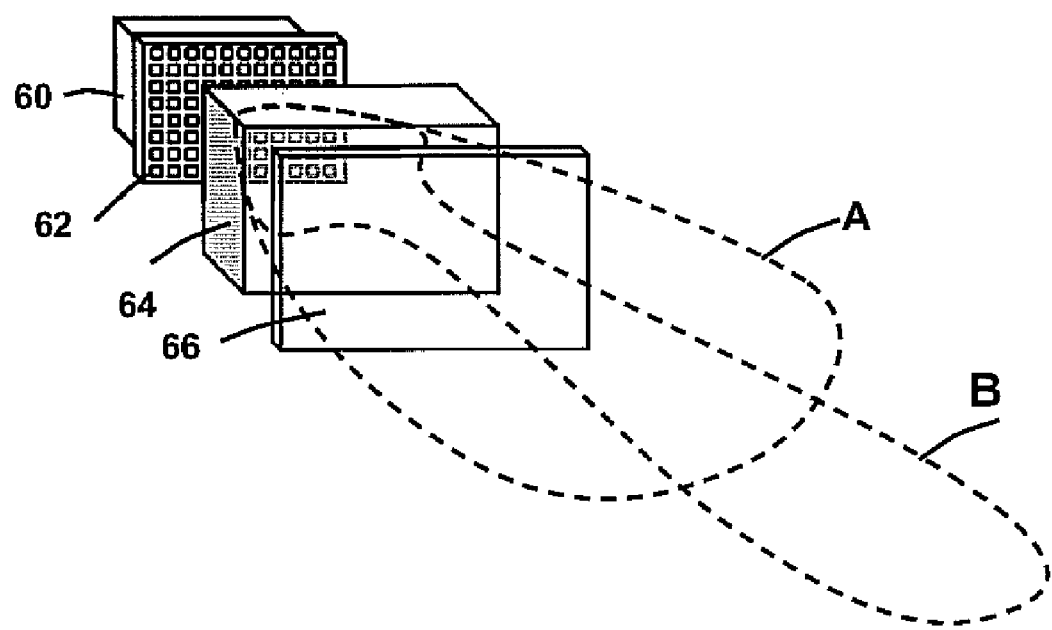
FIG. 4 shows a radar system including an antenna array and active lens.

FIG. 4 shows a configuration having antenna array 62 on substrate 60, covered by a lens assembly comprising radome 64 and grille element 66. The radome protects the radar antenna from the environment. In this example, the radome includes a metamaterial, so that the radome provides the function of an active lens. The grille element may provide a further protective function. Further, the grille element 66 may include a second metamaterial, for example for further modification of the beam width and/or scan angle. In another example, the metamaterial lens is included in the grille element 46, and the radome is not an active element.

Figure 5A:
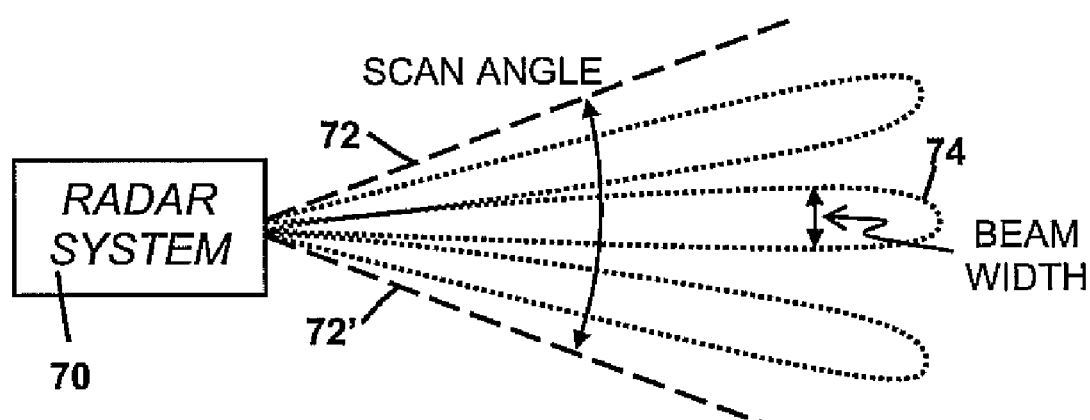
FIGS. 5A and 5B illustrate radar fields of view.
Figure 5B:
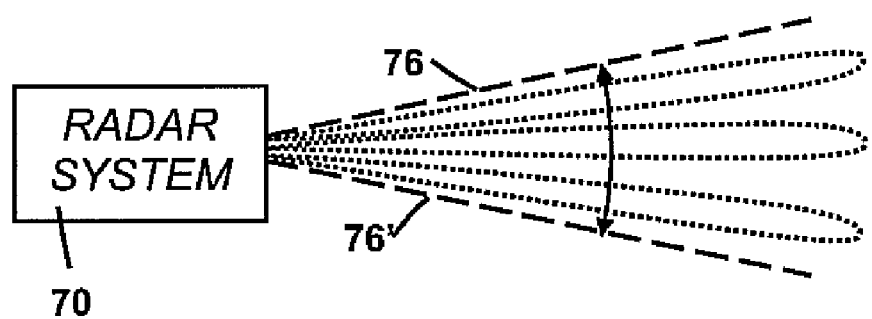

FIGS. 5A and 5B illustrate fields of view of a radar system 70. FIG. 5A shows three possible beam positions as dotted lines, including central position 74 and two angularly offset positions each side of the central position. Using beam scanning, a field of view indicated by dotted lines 72 and 72' is obtained. The beamwidth is shown using a double-headed arrow. FIG. 5B shows a narrower field of view, indicated by dashed lines 76 and 76'. The narrower field of view can be obtained by reducing the scan angle, and/or reducing the beamwidth. For a narrow beamwidths, the field of view is approximately equal to the scan angle.

In some examples, the field of view is adjustable in a plane substantially parallel to the road surface supporting the vehicle. The field of view may be generally conical, or narrower in a direction normal to the road surface.

Figure 6:
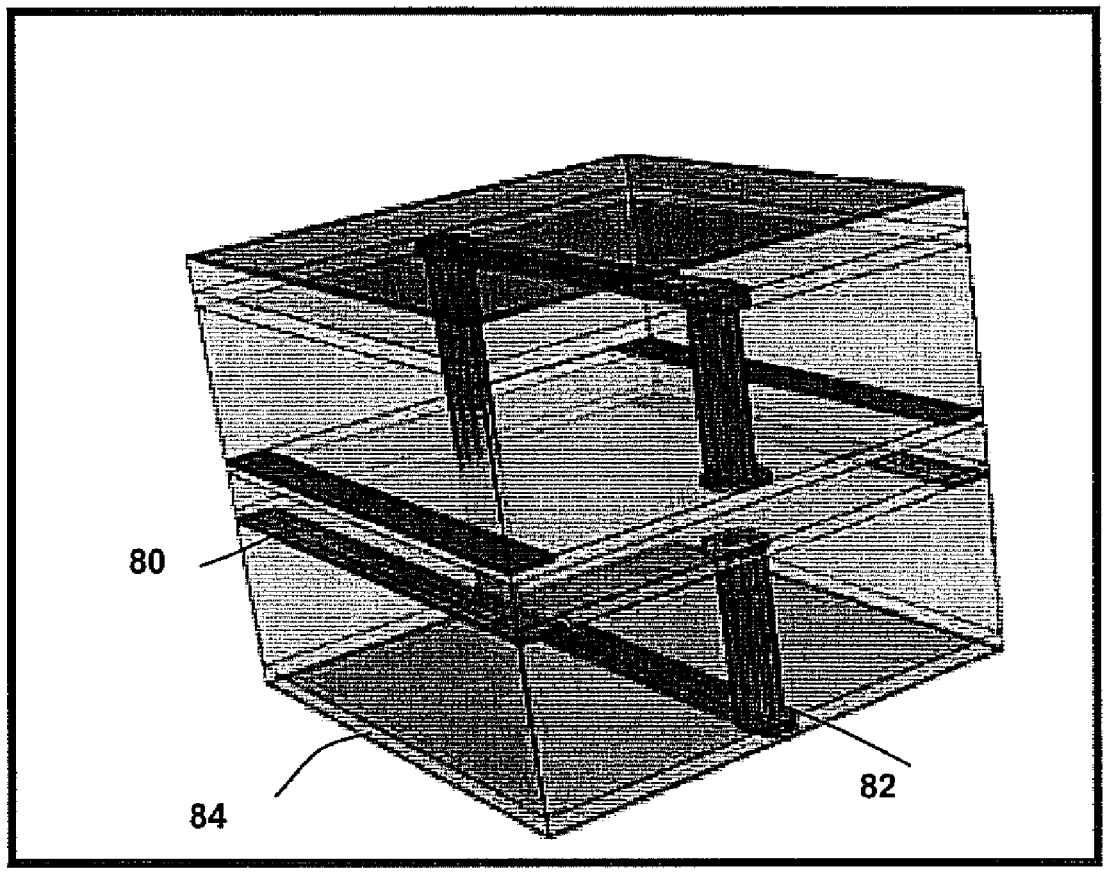
FIG. 6 illustrates a possible metamaterial configuration for use in a lens.

FIG. 6 illustrates a possible composite material for use as a metamaterial comprising conducting forms such as 80 and 82 supported by insulating media such as circuit board 84. Various metamaterial designs known in the art may be used in embodiments of the present invention. The composite material comprises a unit cell having a unit cell size. One or more of these unit cells may be used to form a metamaterial. In this illustration the unit cell of the metamaterial includes a wire having a wire width and a cap plate having a cap plate diameter. These parameters and the separation of the conductive elements may be adjusted to obtain desired parameters.

The unit cell configuration can be chosen to obtain a desired refractive index and/or refractive index gradient at the operating frequency, or frequencies of the radar antenna. The lens may be activated and deactivated, partially activated, and/or switched between a number of various configurations, or allow substantially continuous control of the beam resolution.

Possible composite materials for use in embodiments of the present invention are described in "Fabrication and characterization of a negative index composite metamaterial", A. F. Starr, P. M. Rye, D. R. Smith, S. Nemat-Nasser, *Physical Review B,* 70, 115113 (2004). As described therein, composite panels were made having a negative refractive index between 8.4 and 9.2 GHz. The composite metamaterial was fabricated using multilayer circuit board lithography, with vias used to form sections of the scattering elements perpendicular to the circuit board surfaces.

Figure 7:
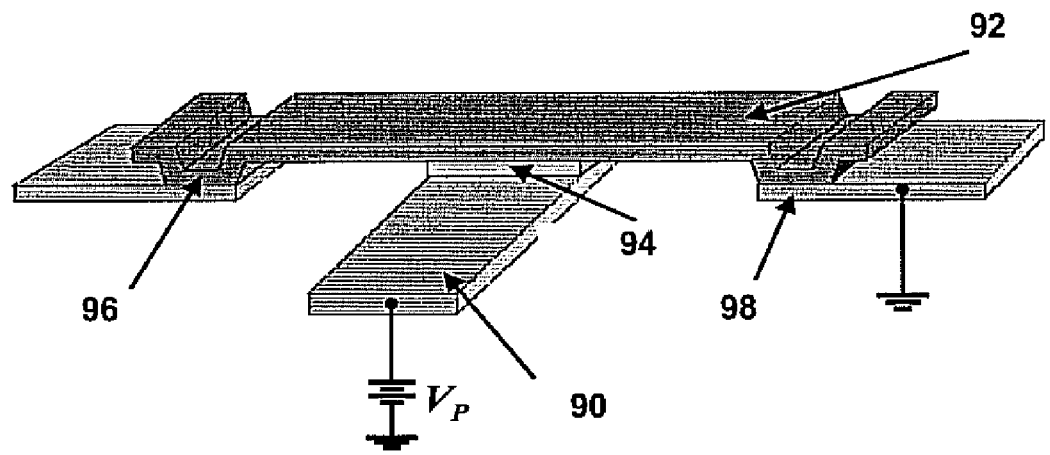
FIG. 7 illustrates a possible tunable active metamaterial for use in a lens.

FIG. 7 shows an example of a MEMS device for use in an active metamaterial. The system includes an electrode 90 and a beam switch 92. There is a dielectric material 94 located between the electrode and the beam switch. The beam switch has a free end 96 and a fixed end 98, and is electrically selectable using an electronic control signal.

Figure 8:
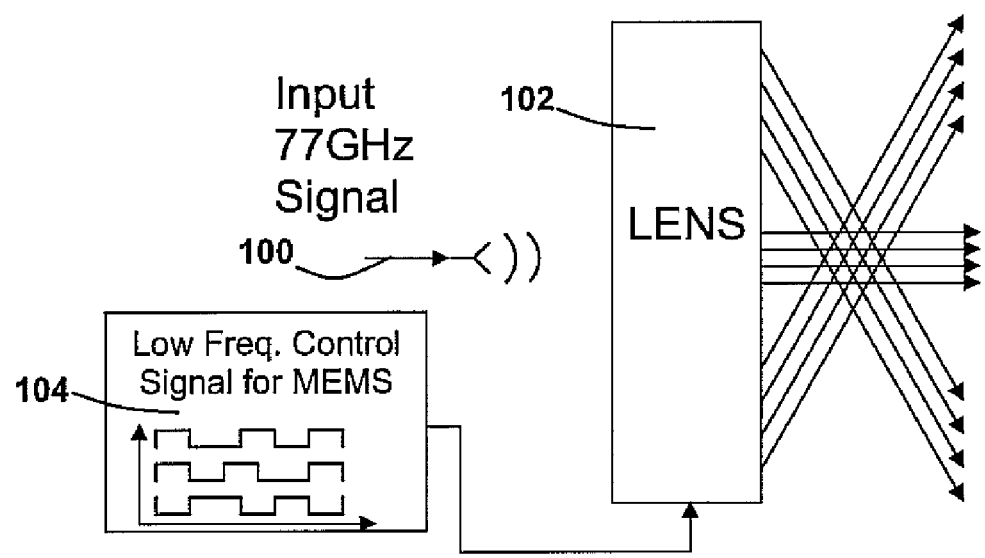
FIG. 8 illustrates control of the refractive index of an active metamaterial lens using a control circuit.

FIG. 8 is a schematic showing an input radar signal at 100 passing through an active lens 102, such as a metamaterial lens. A control circuit 104 provides a low frequency control signal for MEMS switches within the metamaterial lens, allowing tuning, activation/deactivation of the lens, or otherwise selecting a desired lens property. The use of negative index active metamaterials allows the fabrication of active diverging lenses that can be used to modify the field of view of a radar system.

Figure 9:
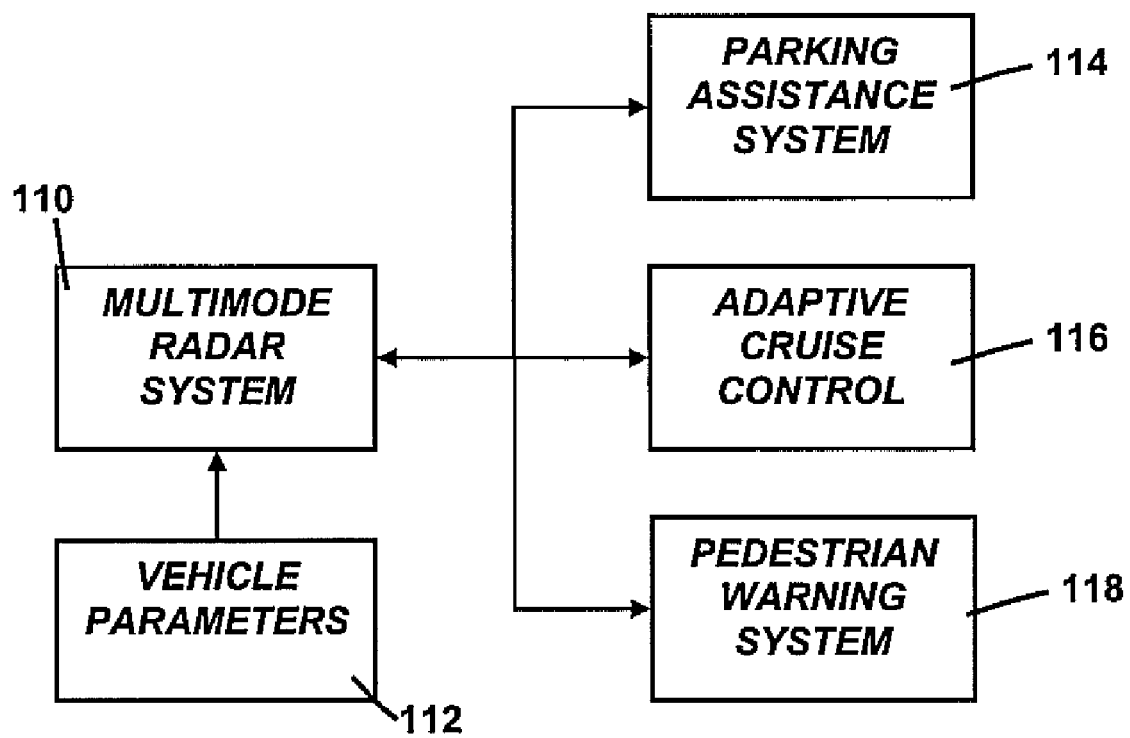
FIG. 9 illustrates an application of an improved radar system according to the present invention

FIG. 9 illustrates an application of an improved radar system according to the present invention. Radar system 110, having a plurality of modes having different fields of view, receives vehicle parameters from vehicle parameter source 112, which may comprise one or more vehicle sensors such as a speed sensor or GPS. The radar system provides data to vehicle systems such as a parking assistance system 114, an adaptive cruise control 116, and a pedestrian warning system 118. These vehicle systems are exemplary, and other combinations may be used. The data provided by the radar system may include the relative position and/or speed of external detected objects. Other sensor systems, such as visual or IR, may also be used to provide data to these vehicle systems. Selection of operating mode, and field of view, may be determined or influenced by the vehicle parameters, or by feedback from other vehicle systems.

Active Material

In examples of the present invention, an active lens allows adjustment of the radar beam from, for example, a long range narrow beam to a shorter range wide beam, as needed or as controlled by the vehicle operator and/or vehicle control system. The lens comprises an active material having a property, such as refractive index at radar frequencies, which is adjustable so as to modify the beam properties, such as beam width and/or scan angle. The refractive index of the active material may be controlled using an electronic control input provided by an electronic control circuit.

Some embodiments of the present invention include a lens assembly including a plurality of lenses, for example where at least one lens is an active lens, having one or more properties that are adjustable so as to modify the beam properties of a radar beam passing through the lens assembly.

Metamaterials

In some examples, the active material includes a metamaterial. Conventional lenses do not allow a negative index of refraction or large gradients of refractive index, though this may be obtained using metamaterials. In a metamaterial, permittivity and/or permeability may be adjusted, for example for better impedance matching.

A metamaterial lens may be activated or deactivated, or its properties otherwise adjusted, using a control input signal. A MEMS type switch, a tuning device, a Schottky semiconductor diode, or any combination thereof may be used, but other types of switching or control elements may be used in the lens, for example using electrical tuning of one or more components within the metamaterial.

Example metamaterials include electrical conductors, such as metals, conducting polymers, or other electrical conductors, disposed on or otherwise supported by a non-conducting medium. For example, metamaterial lenses may comprise wires, vias, films, and the like. Metamaterial lenses may comprise multilayer printed circuit boards, with associated components such as switches, interconnections, tunable elements, and the like.

Metamaterials may be configured to have negative refractive index for radar wavelengths. For example, a metamaterial comprising open conducting rings having axial direction approximately along the radar propagation direction may have a negative permeability and negative refractive index. Examples include C-shape conductors and split-ring resonators.

Conducting structures may be selectively interconnected using switches. The selective interconnection of conducting elements, such as wires or other conducting forms within the metamaterial allows a lens comprising such material to be activated or deactivated or otherwise tuned. In one example, the lens has little effect on a transmitted beam passing through it, whereas in the activated state an appreciable divergence (or possibly convergence, depending on metamaterial parameters) occurs.

The selective interconnection or disconnection or otherwise tuning of conducting elements within unit cells of a metamaterial may modify the properties of the bulk metamaterial to such an extent that in the lens may have negligible, small, or a larger effect on a radar beam passing through it, and the effect may be controlled by switches, such as MEMS, within or associated with the metamaterial.

Metamaterials may be fabricated using commercial printed wiring board multilayer technology, for example as described in Starr et al., "Fabrication and characterization of a negative-refractive-index composite metamaterial", *Physical Review B*, 70 (2004). For operation at 77 gigahertz, the unit cell size of the metamaterial may be approximately 400 microns, and hence feature sizes of between 10 and 20 microns may be used.

Metamaterials may be fabricated using a microfabrication method. For example, unit cell structures can be imprinted on a non-conductive substrate using lithography, deposition, and etch processes similar to those used for microfabrication of integrated circuits or MEMS. The non-conductive substrate may be a glass (such as borosilicate glass or other heat-resistant glass), ceramic (such as a glass-ceramic), plastic, or other material.

Gradient index lenses (GRIN lenses) may also be formed using metamaterials, and embodiments of the present invention include the use of active GRIN lenses. Furthermore, adjustment of an active lens may not be uniform across the entire lens. For example, a portion of the lens area may be activated or deactivated or otherwise tuned, while other portions are not changed.

A lens assembly may include a radome and/or vehicle grille component comprising metamaterials, through which the transmitted radar travels. Lenses may be activated, deactivated, tuned, or otherwise adjusted so as to control the beam width and/or scan angle of the radar. The beam width and scan angle are hence adjustable.

Vehicle Grille

A vehicle typically has a grille at the front of the vehicle, the grille having openings allowing air to enter and pass over the radiator. The grille is often an important aspect of the appearance of the vehicle, and a conventional radar apparatus attached to the grille may significantly detract from the appearance of the vehicle.

In some embodiments of the present invention, the radar antenna is located behind the grille, so that the radar beam passes through the grille. In further embodiments, a grille component comprises an active material, such as a metamaterial, and the active material is adjusted so as to modify the beam and/or scan angle properties. A grille component may be the vehicle badge, such as a vehicle badge carrying the trademark of the manufacturer. The vehicle badge may comprise a metamaterial, the vehicle badge acting as an active lens.

An example apparatus includes a lens assembly that comprises a radome and a separate element (such as the vehicle grille or an element attached thereto), the lens assembly being operable to control and/or modify the beam width of a radar system. The radome is optional, and may be omitted. In other examples, the lens assembly may comprise a component of the vehicle grille or an element attached thereto, a component of the vehicle front or rear bumper, or other vehicle component.

Other Vehicle Locations

A radar system according to an embodiment of the present invention may be located at the front of the vehicle, for example proximate to the vehicle grille as discussed above. Other possible locations include the rear and sides of the vehicle, for example within a bumper assembly (front and/or rear bumper), lamp re, trim piece, or other vehicle component. A vehicle may have multiple antenna and lens assemblies according to embodiments of the present invention.

Multiple Operational Modes

Operational modes may include a narrow scan angle with high resolution beam width mode for automatic cruise control (ACC) and/or pre-crash sensing (PCS); a medium scan angle with intermediate beam width mode for cut-in detection, enhanced PCS, and/or pedestrians detection; and a wide scan angle with lower resolution beam width mode used for pedestrian detection in urban areas, parking assistance, or other applications. A single apparatus may provide two or more of such operational modes.

For simplicity, the following examples illustrate a system with two modes, a first mode having a narrow scan angle and a high resolution beam and a second mode having a wide scan angle and a lower resolution beam. However, there may be three or mode modes, each having different beam and/or scan properties such as beam width, beam scanning, scan angle, center direction of the beam, transmitted power, pulsed or continuous mode transmission, modulation type, or other beam parameters.

A system may switch from a first operational mode to a second operational mode at intervals. An active lens may be activated and deactivated at intervals, for example an active lens activation may occur at intervals in the range 0.1-10 seconds, such as in the range 0.2-2 seconds, the lens being deactivated at some time between activations.

In other examples, driver selection is used to select an operational mode, for example possibly over-ruling a default setting. A driver may engage a wide scan or wide beam mode in urban areas or a narrow scan or narrow beam mode during highway driving.

The system may switch into a particular mode due to detected external parameters. For example, a narrow beam mode may be selected automatically due to one or more of the following: vehicle speed over a threshold parameter; poor visibility conditions such as detected precipitation or darkness; detection of an unknown object using the radar or other sensor, a narrow beam then being used for imaging and/or identification; highway driving (for example, as determined from a navigation system, or vehicle behavior (such as a prolonged period of high speed); or other parameter.

A wide beam mode may be selected automatically due to one or more of the following parameters: low speed; location in urban area; frequent stops (for example using vehicle speed history); gear selection (such as engagement of reverse or low gear); or other parameter.

In some examples, a first operating mode may switch between two or more of a plurality of available adjustments and have an average beam width or scan angle less than a second mode. For example, a first mode may switch between narrow and medium beam widths or scan angles, and a second mode may switch between wide and medium beam widths or scan angles. Different operating modes may include different combinations of beam widths or scan angles with different functionalities.

A process for assisting the operation of a vehicle comprises providing a radar system producing a radar beam; passing the radar beam through a lens assembly including an active lens; adjusting the active lens within the lens assembly at intervals so as to modify a field of view of the radar system; obtaining first data using a first field of view (beam width, scan angle, or combination thereof), obtaining second data using a second field of view, and using the first data and second data to assist the operation of the vehicle. For example, the first field of view may be narrower than the second field of view. Adjusting an active lens within the lens assembly at intervals may comprise providing an electronic control signal to an active metamaterial.

Imaging Systems

Optical imaging systems are often large and expensive. Conventional visible and IR systems need an unobstructed line of sight, which can be limited by dirt or ice buildup. Hence the use of such systems in vehicular applications is restricted. Improved radar systems according to embodiments of the present invention may be used in place of (or to augment) conventional visible and IR camera systems. A compact millimeter (or sub-millimeter) wave imaging system may be combined with a radar ranging and/or distancing functionalities, to provide an improved multi-functional apparatus.

In some embodiments, a synthetic aperture radar (SAR) can be used to form images of the vehicle environment. The aperture may be scanned using an active lens, or other method such as using phase adjustments between antenna elements. The same active lens may be used for scanning and beamwidth adjustments of a radar beam. A DBF (digital beamforming) antenna may be used, and lenses according to embodiments of the present invention used to reduce the size of such an antenna for vehicular applications.

Systems according to the present invention can be used in imaging systems, including high resolution target or obstacle identification, in place of or to augment conventional visible and IR camera systems. A radar system may also be used to provide information on the environment beyond the limit of conventional headlight illumination at night, or in other conditions of poor visibility.

Radar Operation

A radar apparatus may operate as a pulsed radar, and the pulse repetition frequency can be a predetermined value, or selected using an estimated or determined distance of objects in the vehicle environment. Using an active lens, the field of view of the radar apparatus may be changed rapidly, so that data can be collected from relatively wide and narrow fields of view. Data from different modes of operation may be collected over sequential, overlapping, or concurrent time intervals.

The operational mode(s) of the radar apparatus may be selected using vehicle parameters (including current and/or historical data) such as vehicle operational parameters, radar data, GPS or other positional data, and/or other data. Vehicle operational parameters include speed, steering inputs, braking, gear changes, and the like. For example, a sustained high speed can be taken to indicate highway driving, and the radar system may operate for most or all of the time in a narrow field of view mode, for example as part of an adaptive cruise control system. Stop-and-go driving with low speeds and many turns may indicate urban driving, and a wider field of view mode may be used, for example as part of a pedestrian warning system.

The radar apparatus may cycle through two or more operating modes, each with a different field of view. The cycle time, and time in each mode, may be adjusted according to vehicle parameters.

In some embodiments of the present invention, the antenna can operate in a monopulse mode. Reflected signals from different portions of the beam may be compared, allowing improved determination of motion of objects in the field of view. Monopulse operation may include phase, amplitude, or combined phase/amplitude monopulse operation. For example, an example monopulse radar system detects signals from an object (such as another vehicle) at least two locations (which may be different portions of an antenna array), and obtains positional information relative to an azimuthal direction using the sum and the difference of the detected signals.

In some examples, the radar antenna produces a beam that is scanned over a scan angle. A beam may be scanned in one plane, such as generally parallel to the road surface, or in two dimensions. Scanning may be achieved through mechanical rotation of the antenna, phase adjustments between radiative elements, or other approaches known in the art. An active lens, using a variable beam refraction, can modify the scan angle, and hence the field of view. The field of view of the apparatus is related to the scan angle after the beam passes through the lens assembly, and this can be modified by the active lens.

Relative motion of objects may be determined using Doppler shift measurements, or from changes in detected distance versus time. Radar data can be combined with other data sources to improve vehicle operation safety.

Communications Systems

A radar apparatus according to an embodiment of the present invention may also have a communication functionality. Data may be carried over a radar beam either transmitted or received by the radar antenna. An active lens may be used for beam width and/or beam steering applications.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. An apparatus, the apparatus being a radar system for a vehicle, the apparatus comprising:
   a radar antenna, operable to produce a radar beam; and
   a lens assembly including an active lens, the active lens formed of a metamaterial, the metamaterial having an adjustable property,
   the radar beam passing through the lens assembly;
   the radar beam having a field of view for detecting an object, the field of view having a plurality of characteristics including a beam width, a scan angle being the angular range of the field of view and a beam shape wherein at least one of the plurality of characteristics is changed using the adjustable property of the metamaterials.

2. The apparatus of claim 1, wherein the adjustable property is a refractive index at radar beam frequencies.

3. The apparatus of claim 1, wherein the lens assembly includes a vehicle component.

4. The apparatus of claim 3, wherein the vehicle component is a grille component.

5. The apparatus of claim 3, wherein the vehicle component is a vehicle badge.

6. The apparatus of claim 3, wherein the vehicle component is a bumper component.

7. The apparatus of claim 1, wherein the apparatus has a first operational mode having a first field of view, and a second operational mode having a second field of view,
the second field of view being wider than the first field of view.

8. The apparatus of claim 7, wherein the first operational mode assists an adaptive cruise control for the vehicle.

9. The apparatus of claim 7, wherein the second operational mode assists a parking assistance system for the vehicle.

10. The apparatus of claim 7, wherein the second operational mode assists a pedestrian detection system for the vehicle.

11. The apparatus of claim 1, wherein the field of view being approximately equal to the beam width.

12. The apparatus of claim 1, further comprising an electronic circuit operable to provide an electronic control signal to the active lens,
the field of view of the beam being adjustable using the electronic control signal.

13. The apparatus of claim 12, wherein the electronic circuit receives a speed signal from the vehicle.

14. The apparatus of claim 12, wherein the metamaterial includes electrically conducting elements interconnected by switches,
the switches being selectively opened or closed using the electronic control signal.

15. The apparatus of claim 14, wherein the metamaterial comprises a multi-layer printed circuit board assembly.

16. An apparatus, the apparatus being a radar system for a vehicle, the apparatus comprising:
a radar antenna, operable to produce a radar beam;
a lens assembly including an active lens, the radar beam passing through the lens assembly; and
an electronic circuit operable to provide an electronic control signal to the active lens, the field of view of the beam being adjustable using the electronic control signal,
the active lens formed of a metamaterial,
the field of view having a plurality of characteristics including a beam width, a scan angle and a beam shape, wherein at least one of the characteristics is changed by using an adjustable refraction index of the metamaterial.

17. The apparatus of claim 16, wherein the lens assembly includes a vehicle component.

* * * * *

UNITED STATES PATENT AND TRADEMARK OFFICE
CERTIFICATE OF CORRECTION

PATENT NO. : 7,724,180 B2
APPLICATION NO. : 11/744503
DATED : May 25, 2010
INVENTOR(S) : Serdar H. Yonak et al.

It is certified that error appears in the above-identified patent and that said Letters Patent is hereby corrected as shown below:

Column 8 Line 17 replace "re" with --fixture--

Signed and Sealed this

Fourteenth Day of September, 2010

David J. Kappos
*Director of the United States Patent and Trademark Office*